United States Patent
Parsons et al.

(10) Patent No.: US 6,360,178 B1
(45) Date of Patent: Mar. 19, 2002

(54) SYSTEM AND METHOD FOR LOCATING A DISTURBANCE IN A POWER SYSTEM BASED UPON DISTURBANCE POWER AND ENERGY

(76) Inventors: Antony Cozart Parsons, 4505 Duval St., Apt. No. 380, Austin, TX (US) 78751; William Mack Grady, 4108 Chert Dr., Round Rock, TX (US) 78681; Edward J. Powers, Jr., 8703 Mountainwood Cir., Austin, TX (US) 78759; Surya Santoso, 9008 Tall Timber Dr., Knoxville, TN (US) 37931; John Carol Soward, 2635 Pinta Cr., Grand Prairie, TX (US) 75052

( * ) Notice: Subject to any disclaimer, the term of this patent is extended or adjusted under 35 U.S.C. 154(b) by 0 days.

(21) Appl. No.: 09/207,969

(22) Filed: Dec. 9, 1998

Related U.S. Application Data

(60) Provisional application No. 60/069,164, filed on Dec. 9, 1997.

(51) Int. Cl.$^7$ ................................ G06F 15/22
(52) U.S. Cl. .................... 702/65; 702/65; 700/292; 700/294; 340/310.01
(58) Field of Search ................ 702/60, 61, 62, 702/65; 700/291–295, 297; 713/340; 340/310.01, 310.06, 310.07

(56) References Cited

U.S. PATENT DOCUMENTS 5,734,575 A * 3/1998 Snow et al. ................ 702/58
5,856,776 A * 1/1999 Armstrong et al. ..... 340/310.01
6,112,136 A * 8/2000 Paul et al. .................. 700/293

* cited by examiner

Primary Examiner—Kamini Shah
(74) Attorney, Agent, or Firm—Hunton & Williams

(57) ABSTRACT

A disturbance locating system deployed within a power grid to estimate a location of a disturbance in a power system includes a voltage transducer, a current transducer and disturbance energy determination circuitry. The system may also include disturbance power determination circuitry. The voltage transducer couples to an output of a voltage transformer, the output of the voltage transformer representative of a voltage on a line within the power grid. The current transducer couples to an output of a current transformer, the output of the current transformer representative of the current flowing through the line, the output having a forward reference direction and a behind reference direction. The voltage and current transformers may be hard wired to the line. The disturbance energy determination circuitry couples to the voltage transducer and the current transducer. Based upon the inputs received, the disturbance energy determination circuitry determines disturbance energy flowing in the line and estimates a direction of disturbance energy flow with respect to the system as either in front of or behind of the disturbance locating system. The disturbance energy determination circuitry may include disturbance power determination circuitry that couples to the voltage transducer and the current transducer. In such case, the disturbance power is provided to the disturbance energy determination circuitry for estimating a relative direction to the disturbance.

7 Claims, 13 Drawing Sheets

SYSTEM AND METHOD FOR LOCATING A DISTURBANCE IN A POWER SYSTEM BASED UPON DISTURBANCE POWER AND ENERGY

CROSS-REFERENCE TO A PROVISIONAL APPLICATION

This application claims the benefit of U.S. Provisional Patent Application Ser. No. 60/069,164 filed on Dec. 9, 1997.

BACKGROUND

1. Technical Field

The present invention relates generally to power systems; and more particularly to a system and method of operation for locating a disturbance in a power system based upon disturbance power and energy.

2. Related Art

The construction and operation of power systems has been generally known for years. However, with the relatively recent proliferation of sensitive electronic loads such as ASDs and microprocessors, the subject of power quality has recently received much interest. Efforts have been placed over the previous several years in an effort to characterize the overall level of power quality delivered to customers on various electric systems. Much work has also been done to develop systems that automatically identify the major types of power quality disturbances measured on distribution networks, such as capacitor switching, voltage sag, and impulsive transients.

Various types of commercial loads, such as semiconductor processing plants, have enhanced requirements for clean, continuous power. When the power is interrupted for any reason, the work within the plants may also be interrupted, oftentimes causing damage to ongoing processes. Thus, utility companies are often held to an agreed upon level of performance with respect to such loads. If a disturbance occurs, the utility company may recompense the customer for damages caused. Further, in the near future, parties responsible for disturbances may be penalized for causing interruptions in the power supply that result in customer downtime. However, presently, disturbances cannot be easily located. Resultantly, liability relating to caused disturbances is difficult to assign.

Thus, there is a need in the art for locating disturbances within power systems in a reliable manner so that liability for causing the disturbances may be assigned.

SUMMARY OF THE INVENTION

Thus, in order to overcome the shortcomings of the prior systems, among other shortcomings, a disturbance locating system constructed according to the present invention is deployed within a power grid to estimate a relative direction to a disturbance in a power system. The system includes a voltage transducer, a current transducer and disturbance energy determination circuitry. The system may also include disturbance power determination circuitry.

The voltage transducer couples to an output of a voltage transformer, the output of the voltage transformer representative of a voltage on a line within the power grid. The current transducer couples to an output of a current transformer, the output of the current transformer representative of the current flowing through the line, the output having a forward reference direction and a behind reference direction. According to one embodiment, the voltage and current transformers are hard wired to the line. However, in another embodiment, the voltage and current transformers need not require physical coupling to the line to produce outputs representative of the state of the line.

The disturbance energy determination circuitry couples to the voltage transducer and the current transducer. Based upon the inputs received, the disturbance energy determination circuitry determines disturbance energy flowing in the line and estimates a relative direction to a source of the disturbance as either in front of or behind of the disturbance locating system. The disturbance energy determination circuitry may include disturbance power determination circuitry that couples to the voltage transducer and the current transducer. In such case, the disturbance power is provided to the disturbance energy determination circuitry for estimating the relative direction to the disturbance.

A method for determining a relative direction to a source of a disturbance according to the present invention may be performed in conjunction with the disturbance locating system. The method includes as a first step monitoring a current flowing through, and a voltage on the line in the power grid at the location. Next, the method includes determining a steady state power flow through the line and a transient power flow through the line during a disturbance condition. Based upon the steady state power flow and the transient power flow through the line, the method includes determining a disturbance power flow through the line. Then, based upon the disturbance power flow through the line, method includes determining a relative direction to the source of the disturbance. The method may also include determining a disturbance energy flow through the line and determining the relative direction to the source of the disturbance is also based upon the disturbance energy flow through the line.

Moreover, other aspects of the present invention will become apparent with further reference to the drawings and specification which follow.

DETAILED DESCRIPTION OF THE DRAWINGS

Overview

For two common disturbance types (capacitor switching and voltage sag) and other types of disturbances, it is possible to determine whether a disturbance originates either in front of or behind a disturbance locating system. This information may tell an engineer whether the disturbance originated towards, or away from, a substation, or inside/ outside a customer facility, depending on the location of the disturbance locating system. If enough disturbance locating systems are available, this information can also be used to pinpoint the source of the disturbance, or at least to identify the feeder segment on which it originated.

Since nonlinear loads can be thought of as sources of power at harmonic frequencies, they can be located by noting that harmonic active power tends to flow away from such a load. On the other hand, when a transient disturbance event is present in a system, it can be thought of as an energy sink. For example, in the case of a capacitor switching disturbance, where a bank of discharged capacitors is switched on-line, energy must be supplied to the bank in order to charge the capacitors. Likewise, during a fault, energy is diverted from other loads to the fault path. The direction of energy flow through the network, therefore, is a key indicator of the disturbance source location.

The direction of the energy flow may be determined by examining sampled three-phase voltage and current waveforms provided by disturbance locating systems. Using the recorded voltage and current waveforms, the three-phase instantaneous power in the circuit is calculated. During steady-state operation, this power has a reasonably constant value. However, when a disturbance event occurs, the network temporarily falls out of steady-state operation, causing a change in the instantaneous power flow. Any change in the instantaneous power during the disturbance is a result of, either directly or indirectly, the disturbance itself.

The difference in the steady-state three-phase instantaneous power and the three-phase instantaneous power during the disturbance is defined as a "disturbance power". Changes in the disturbance power and its integral, the "disturbance energy," allow us to make a decision about the location of the disturbance, as the energy tends to flow towards the disturbance source. The next section uses a simple example circuit to illustrate the procedure.

Deployment and General Construction

Figure 1:
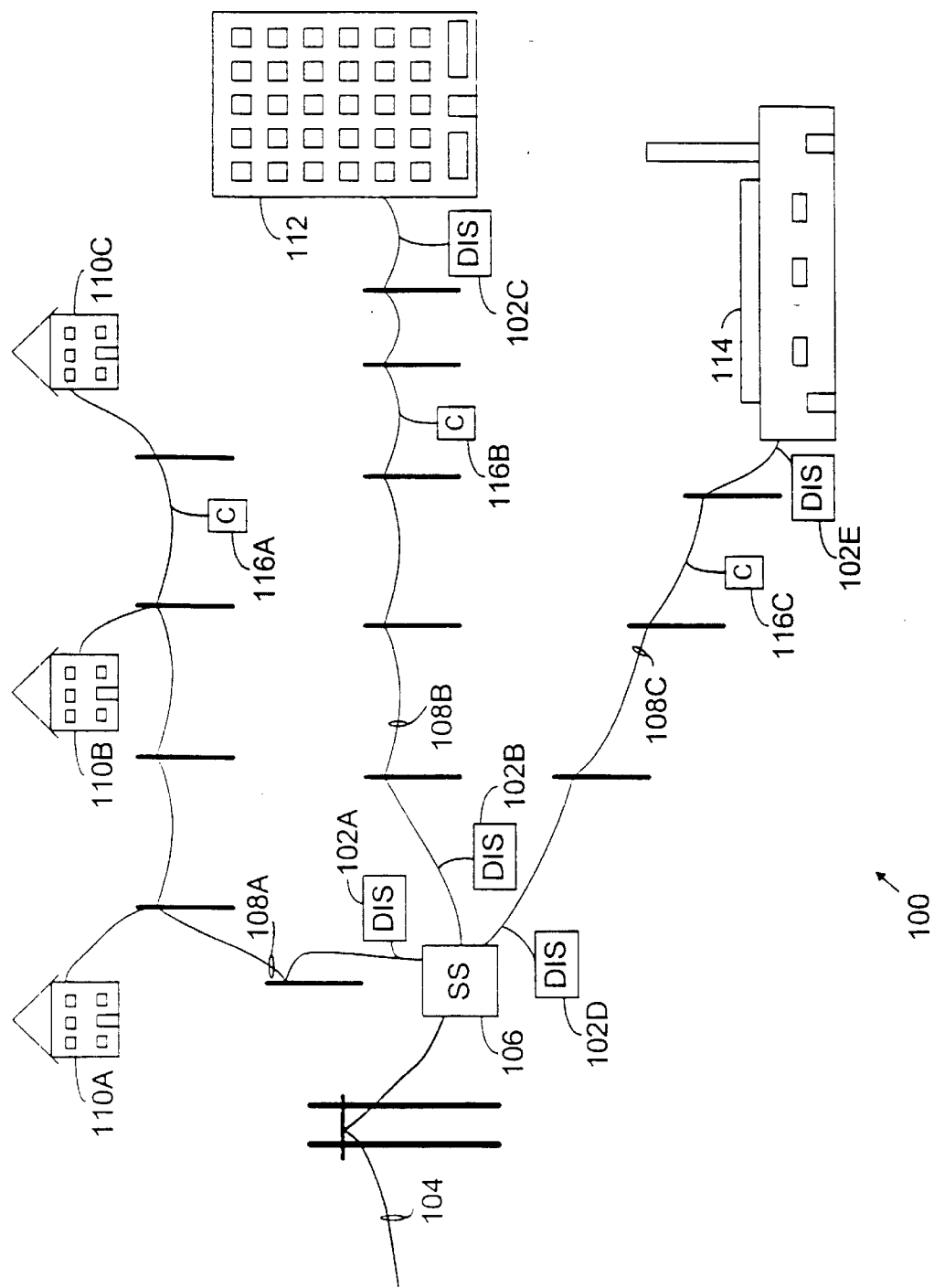
FIG. 1 is a block diagram illustrating a power grid in which disturbance locating systems constructed according to the present invention are strategically placed to determine the location of disturbances within the power grid.

FIG. 1 illustrates a power of a power grid 100 in which disturbance locating systems 102A, 102B, 102C, 102D, 102E and 102F constructed according to the present invention are deployed. The power gird is fed by a transmission line 104 that terminates at substation 106. Equipment within the substation 106 transforms the voltage of the electricity flowing in on the transmission line to a distribution voltage level. Distribution lines 108A, 108B and 108C serve loads within the power grid 100 at one or more distribution voltage levels. Is shown, distribution line 108A serves residential load consisting of homes 110A, 110B and 110C. Further, distribution line 108B serves a hospital 112. Finally, distribution line 108C serves an industrial plant 114.

Within the power grid 100 are capacitor banks 116A, 116B and 116C, each of which may be switched into service and out of service to compensate for loading conditions. However, as will be more fully described herein, when these capacitor banks 116A, 116B and 116C switch, they create disturbances within the system. Contained within the hospital 112 is equipment that must be continuously operational. Thus, the hospital 112 includes a back-up generator and battery supply bank to supply a continuous source of electricity should the power grid 100 fail to serve the hospital's 112 load. Should a disturbance on the system disrupt the supply of electrical power to the hospital 112, the operator of the power grid 100 may be liable to the hospital 112.

Industrial plant 114 also may include sensitive electronic equipment. However, the industrial plant 114 also includes non-conforming load, such as motor drives, that places great demands on the power grid 100 for short periods of time. Thus, when a disturbance external to the industrial plant 114 occurs, it may effect the sensitive electronic equipment contained within the industrial plant 114. Further, however, when the non-conforming load within the industrial plant 114 cycles, it may create disturbances in the power grid 100. Thus, it is useful to determine whether disturbances are created within the industrial plant 114 or external to the industrial plant.

The disturbance locating systems 102A, 102B, 102C, 102D and 102E are strategically placed throughout the power grid 100 to sense disturbances. Each of the disturbance locating systems 102A, 102B, 102C, 102D and 102E determines whether a disturbance occurred in front of, or behind of the system. Thus, for example, if a disturbance occurs within the industrial plant 114, causing a voltage sag that affects the hospital's 112 load, disturbance locating system 102E determines that the disturbance was in front of, and thus within the industrial plant 114. To confirm the determination, the other disturbance locating systems 102A, 102B, 102C and 102D would determine whether the disturbance was located in front of, or behind each system.

Further, should a disturbance be caused by the closing of capacitor bank 116A, for example, disturbance locating system 102A determines that the disturbance was in front of it. The result could then be confirmed by disturbance locating systems 102B and 102D. Moreover, should a disturbance be caused by the closing of capacitor bank 116B, disturbance locating systems 102B and 102C, in combination, will indicate that the disturbance was on distribution line 108B, perhaps at capacitor bank 116B. Investigation of waveforms recorded by the disturbance locating systems 102B and 102C may indicate that the disturbance was of the type caused by the closing of the capacitor bank 116B. Finally, should a lightning strike occur on distribution line 108C, thus creating a short circuit, disturbance locating systems 102D and 102E will indicate that the disturbance occurred on distribution line 108C. Investigation of the recorded waveforms may then indicate that the disturbance was fault based.

Figure 2:
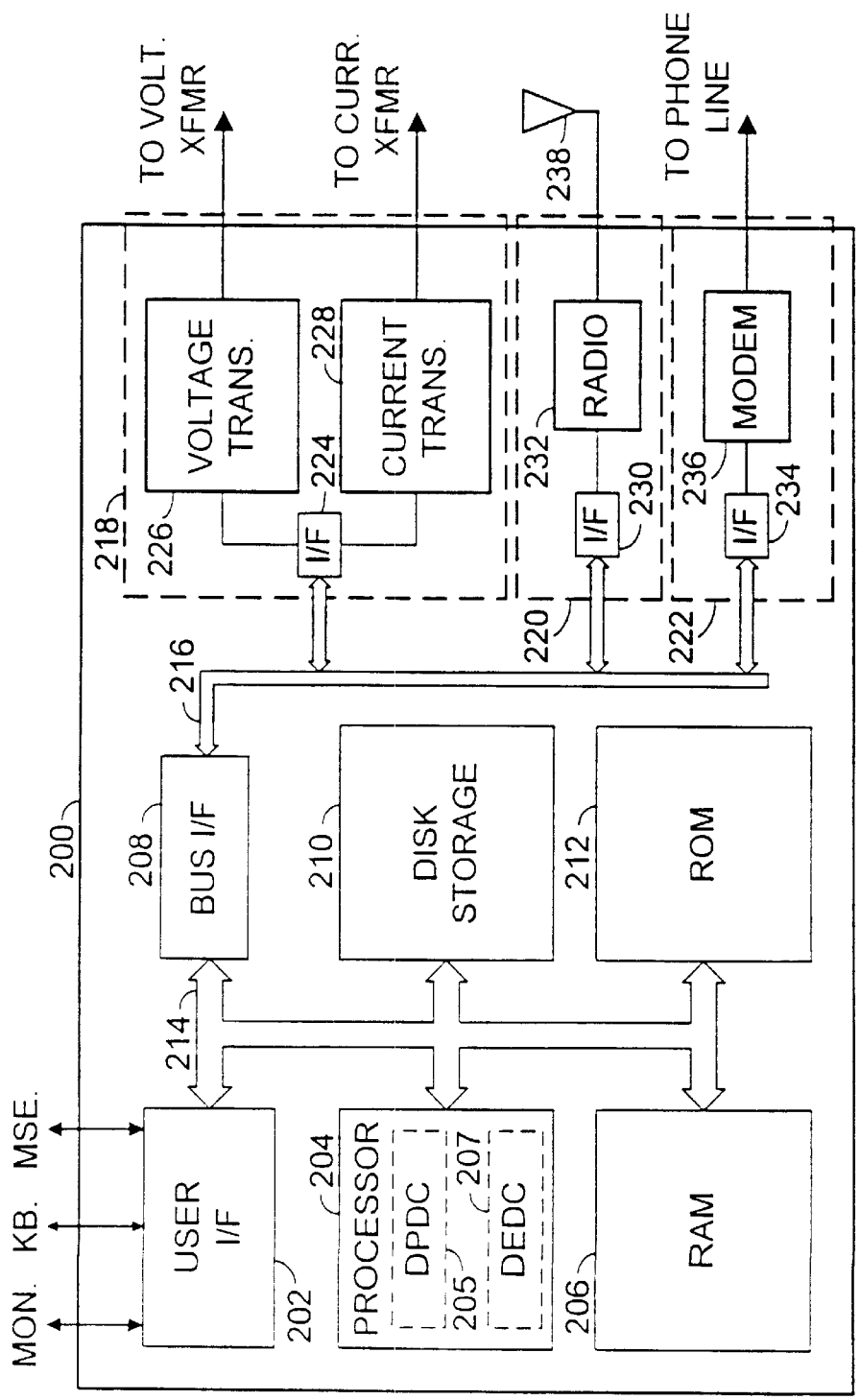
FIG. 2 is a block diagram illustrating the components of a disturbance locating system constructed according to the present invention.

FIG. 2 illustrates a disturbance locating system 200 constructed according to the present invention. The disturbance locating system 200 as illustrated may be constructed to include various modular components. These components may form part of a larger device such as a recording system that performs other functions in addition to locating disturbances. Components in addition to those required to accomplish the teachings of the present invention will be described only to expand upon the teachings of the present invention.

The disturbance locating system 200 includes a user interface 202, a processor 204, random access memory (RAM) 206, a bus interface 208, disk storage 210, read only memory 212, a voltage and current interface card 218 and communication cards 220 and 222. The user interface 202, processor 204, RAM 206, bus interface 208, disk storage 210 and ROM 212 couple to one another via processor bus 214. The processor 204 performs the processing functions required by the system 200. The processor 204 may include a microprocessor programmed specifically for the system 200 or may include a custom processor designed and built to perform operations consistent with the present invention. The RAM 206 services the non-permanent storage needs of the system 200 while the ROM 212 stores program instructions that are written and require permanent storage during a power down state. The disk storage 210 provides bulk storage capability. Further, the bus interface 208 couples a peripheral bus 216 to the processor bus 214 so that the devices coupled to the processor bus 214 may communicate with the cards 218, 220 and 222 coupled to the peripheral bus 216.

The user interface 202 interfaces the system 200 to a monitor, keyboard and mouse, for example. Such devices allow a user to program and operate the system 200. However, the system 200 may also be operated remotely via one of the communication cards 220 or 222. Communication card 220 includes an interface 230 which couples the peripheral bus 216 to a radio 232. The radio couples to an antenna 238 which facilitates wireless communications. Communication card 222 includes an interface 234 which couples the peripheral bus 216 to a modem 236 which connects to a phone line or other wired communication line. Thus, the communication card 222 facilitates wired communication with the system 200.

The disturbance locating system includes disturbance power determination circuitry 205 and disturbance energy determination circuitry 207. In the embodiment illustrated, such circuitry is contained within the processor 204 and would be implemented via special programming and/or construction. However, in other embodiments, the disturbance power determination circuitry 205 and the disturbance energy determination circuitry 207 may be circuitry dedicated to the particular tasks apart from the processor 204.

The voltage and current interface card 218 includes an interface 224 as well as a voltage transducer 226 and a current transducer 228. The voltage transducer 226 couples to a voltage transformer or another device which provides an indication of the voltage on a line being monitored by the system. While in some installations, wired leads connect the system 200 to the output of an actual voltage transformer, in other installations a wired connection is not required with the voltage being measured via a non-wired interface. The current transducer 226 couples to a current transformer having a directional indication so that the system 200 knows the direction of current flow with respect to the system 200. As with the voltage transducer 226, the current transducer 228 may also couple directly to the output of a current transformer. However, in other installations, the voltage transducer 226 may connect to equipment which measures the current flowing in a line without a hard-wired current transformer.

Operating Procedure

Figure 3:
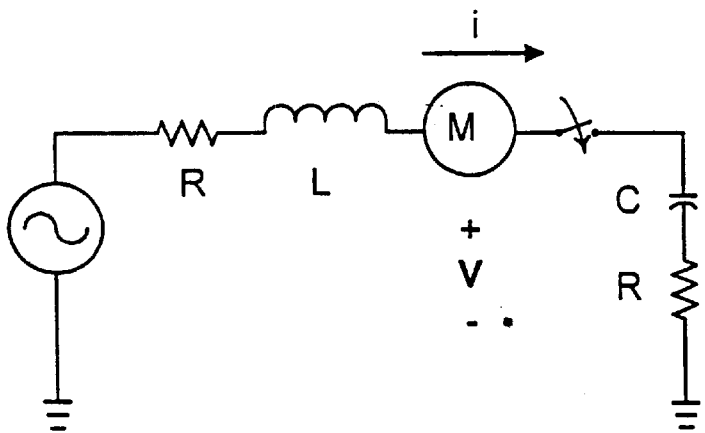
FIG. 3 is a circuit diagram illustrating a circuit used for simulating operating conditions of a power grid during closing of a capacitor bank, the simulated operating conditions employed to demonstrate the principle of operation of a disturbance locating system constructed according to the present invention.
Figure 4:
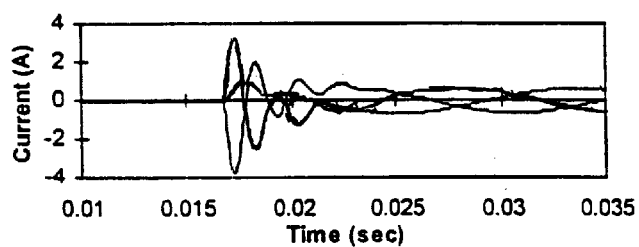
FIGS. 4 and 5 are signal diagrams illustrating simulated current and voltage produced during the simulated disturbance of the circuit of FIG. 3.
Figure 5:
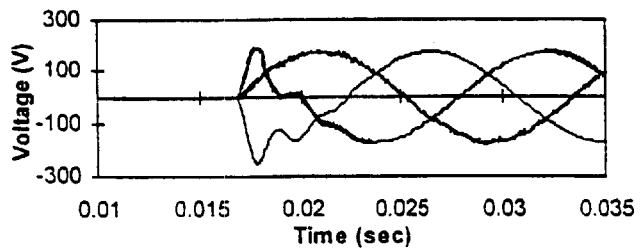

To illustrate the disturbance power and energy that a disturbance locating system constructed according to the present invention measures, operation of a simple three-phase RLC switching circuit is examined. One phase of the circuit is shown in FIG. 3. The following FIGS. 4 and 5 illustrate results produced in modeling the three-phase RLC circuit using a modeling program. The particular modeling program employed is commonly called the alternate transients program version of EMTP (ATP). In the model, the parameters are chosen as follows: $V_{peak}$=170 V, R=10Ω, L=10 mH, and C=10 μF. Further, in the model it is assumed that all three phases of the switch close at the same instant. A two Ω resistor is also placed between each capacitor and ground. The currents through, and voltages across, the capacitors are shown in FIGS. 4 and 5, respectively. The results are as expected.

Figure 6:
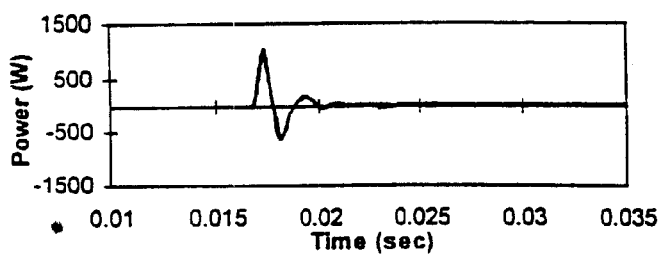
FIGS. 6 and 7 are signal diagrams illustrating the simulated power and energy produced during the disturbance caused by closing the capacitor bank of the circuit of FIG. 3
Figure 7:
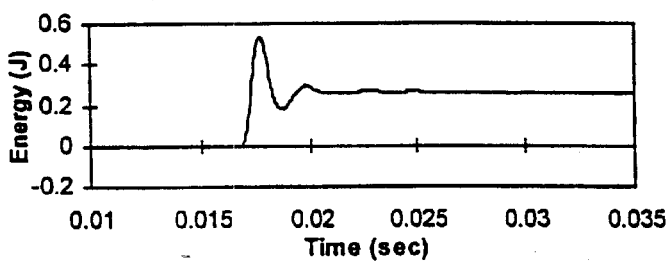

FIG. 6 shows the three-phase instantaneous power delivered to the capacitor bank. While the instantaneous power is zero before the switches close, it has a small non-zero steady-state value. It is clear in this example that the oscillations present in FIG. 6 are caused by the switching event. The disturbance power is the total instantaneous power (here, FIG. 6) minus the steady-state instantaneous power (the part of FIG. 6 after the transient dies out). Therefore, the disturbance power represents the change in instantaneous power due to the disturbance. Since the steady-state instantaneous power is small in this case, the disturbance power is approximately equal to the instantaneous power shown in FIG. 6. Taking the integral of the disturbance power over the duration of the disturbance event gives the disturbance energy, which is the approximate net change in energy flow through the meter towards the disturbance source (here, the capacitor bank). The disturbance energy is shown in FIG. 7.

In this example, the final value of the disturbance energy is positive, so the energy flows from left to right (i.e. in the positive direction) through the meter to the capacitor bank. Also note that the polarity of the initial peak of the disturbance power also tends to indicate the direction of the disturbance source. Here, the positive initial peak matches the positive value of energy flow through the meter. Both of these indicators show that the disturbance source is located to the right of the disturbance locating system.

EXAMPLES OF OPERATION

In this section, the procedure described in the Procedure section is applied to both computer-simulated disturbances and to actual disturbance waveforms for which the disturbance direction is known.

ATP Voltage Sag Disturbance

Figure 8:
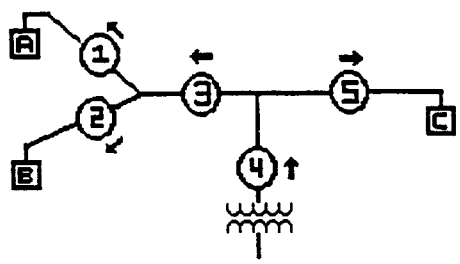
FIG. 8 is a circuit diagram illustrating locations of disturbance locating systems within a simulated circuit, such locations chosen so that the position of a disturbance within the simulated circuit may be identified.

A diagram of the network used for the ATP computer simulation, where locations of disturbance locating systems (also referred to as a recording device or a Meter) and loads are indicated, is shown in FIG. 8. The arrows indicate the direction of positive power flow for each Meter.

Figure 9:
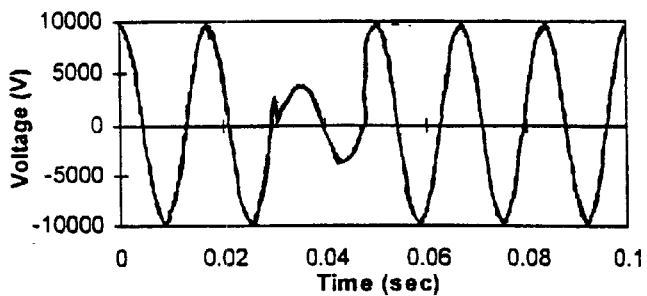
FIGS. 9 and 10 are signal diagrams illustrating the voltage waveforms for a faulted phase of the simulated circuit of FIG. 8 at Meters 1 and 2 of FIG. 8, respectively.
Figure 10:
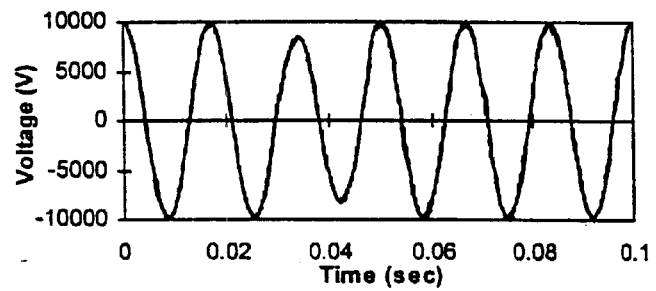
Figure 11:
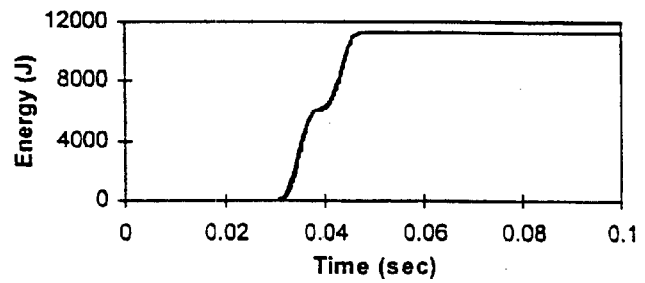
FIGS. 11 and 12 are signal diagrams illustrating the disturbance energy flow through Meters 1 and 2 of the simulated circuit of FIG. 8, respectively.

We begin by simulating a single-phase-to-ground fault located between Meter 1 and Load A that produces a voltage sag throughout the network. The fault has a duration of one cycle, and a fault impedance of 10Ω. The voltage waveforms for the faulted phase at Meters 1 and 2 are shown in FIGS. 9 and 10, respectively. Since Meter 1 shows a greater drop in voltage, we can deduce that it is closer to the fault than Meter 2, but the voltage waveforms alone provide no further information about the location of the fault. The disturbance energy flow through Meters 1 and 2, found by taking the integral of the disturbance power, is shown in FIGS. 11 and 12, respectively.

Figure 12:
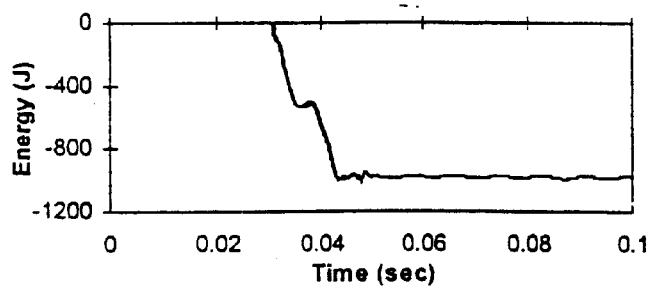

The disturbance energy flow through Meter 1 (FIG. 11) indicates that the fault is located in front of it, while the negative flow shown in FIG. 12 indicates that the disturbance is located behind Meter 2. While not shown here, the disturbance energy flowing through the other meters also indicates the correct directions. By concurrently examining the directions given by all of the disturbance locating systems, we can accurately pinpoint the location of the fault as being in the line segment in front of Meter 1.

Figure 13:
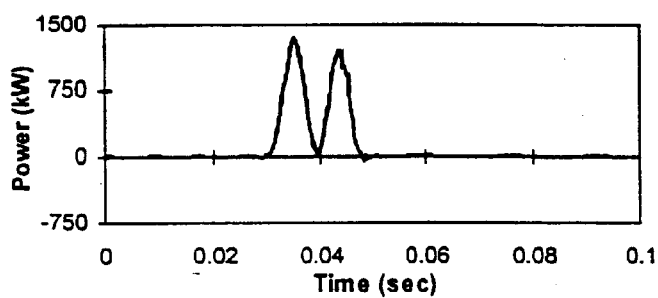
FIGS. 13 and 14 are signal diagrams illustrating the disturbance power through Meters 1 and 2 of the simulated circuit of FIG. 8, respectively.
Figure 14:
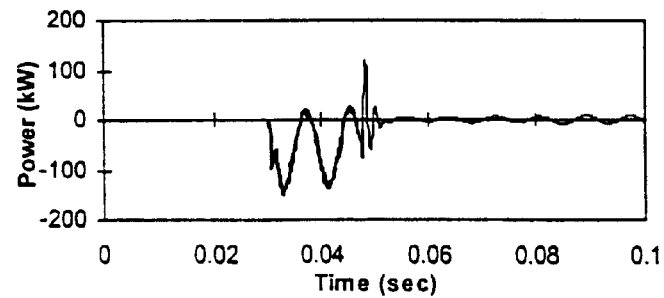

The disturbance power through Meters 1 and 2, shown in FIGS. 13 and 14, respectively, confirms the decision made above. In each case, the polarity of the initial peak is the same as the polarity of the final value of the disturbance energy. Hence, we are able to make a decision about the disturbance source locations with a relatively high degree of confidence.

Similar results are also obtained for high and low impedance faults (50Ω and 3Ω, respectively), as well as for balanced three-phase-to-ground faults.

ATP Capacitor Switching Disturbance

Next, we placed a three-phase, 300 kVAr power factor-correction capacitor bank at Load B of FIG. 8. Unlike the three-phase capacitor switching example described above, where the three switches were closed at the same instant, each of the switches here flashes over near the peak of the associated phase voltage. One phase of the recorded voltages at Meters 1 and 2 is shown in FIGS. 15 and 16, respectively.

Figure 15:
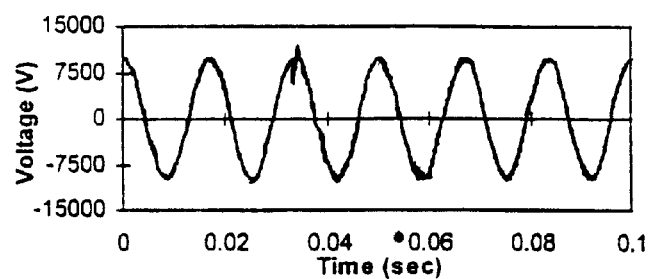
FIGS. 15 and 16 are signal diagrams illustrating one phase of the recorded voltages at Meters 1 and 2 of the simulated circuit of FIG. 8, respectively, during a switching on of a three-phase, 300 kVAr power factor-correction capacitor bank at Load B of the simulated circuit of FIG. 8.
Figure 16:
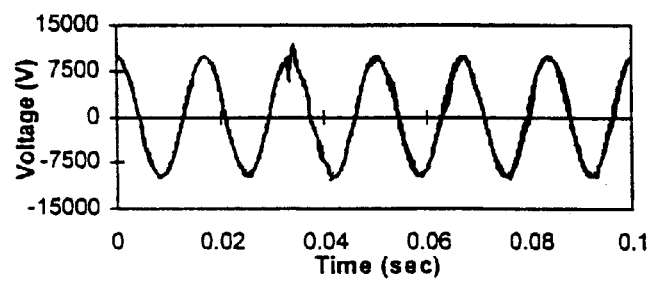
Figure 17:
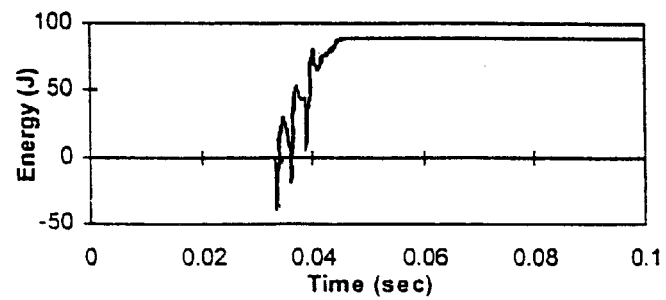
FIGS. 17 and 18 are signal diagrams illustrating the disturbance energy flow through Meters 1 and 2 of the simulated circuit of FIG. 8, respectively, during the switching on of a three-phase, 300 kVAr power factor-correction capacitor bank at Load B of the simulated circuit of FIG. 8.
Figure 18:
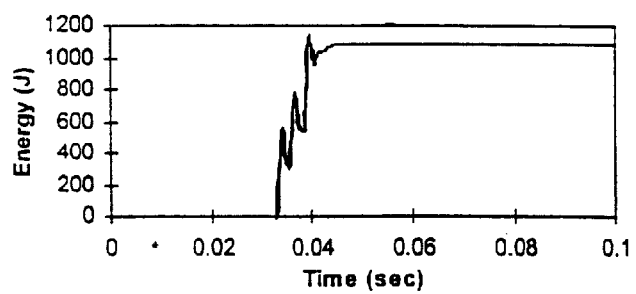

Although FIGS. 15 and 16 look nearly identical, the disturbance source is located behind Meter 1, and in front of Meter 2. FIGS. 17 and 18 show the disturbance energy flow through Meters 1 and 2, respectively, where we see inconsistent results. Although there is a great deal more disturbance energy flow through Meter 2 than through Meter 1, the disturbance energy is positive in both cases, even though the disturbance is not located in front of both meters. If the energy flows from both meters are available, then it is clear by examining the relative magnitude that the disturbance source is more likely located in front of Meter 2. However, if, for example, only Meter 1 were present, finding the direction from the disturbance energy alone would yield incorrect results. It is interesting to note that the final value of energy delivered to the capacitor bank, shown in FIG. 18, is approximately equal to the stored energy in the capacitors given by $3*\frac{1}{2}CV_{peak}^2$.

Figure 19:
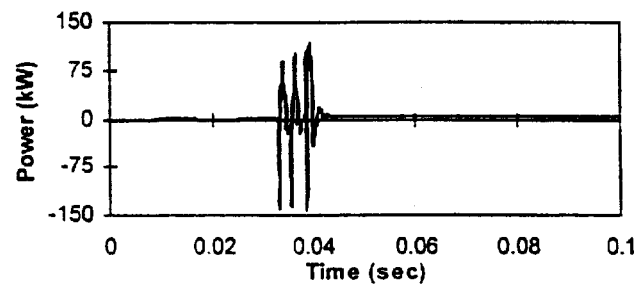
FIGS. 19 and 20 are signal diagrams illustrating the disturbance power through Meters 1 and 2 of the simulated circuit of FIG. 8, respectively, during the switching on of a three-phase, 300 kVAr power factor-correction capacitor bank at Load B of the simulated circuit of FIG. 8.
Figure 20:
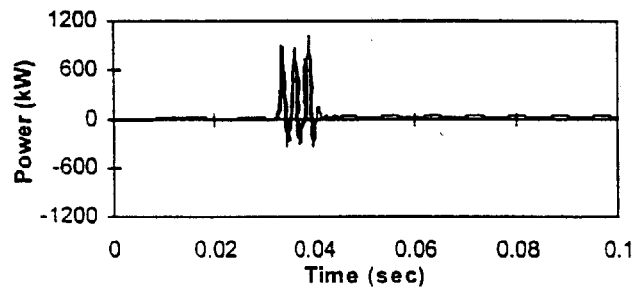

To overcome this inconsistency, we propose that the initial peak of the disturbance power be used, along with the energy flow, to ensure that the direction of the disturbance is determined correctly. FIGS. 19 and 20 show the disturbance power oscillations for Meters 1 and 2, respectively. From FIG. 19, we can see that the initial peak is negative, while FIG. 20 shows that the initial peak is positive. The positive initial peak and relatively high positive energy flow for Meter 2 provide strong evidence that the disturbance source is located in front of Meter 2. On the other hand, the relatively low energy flow through Meter 1, coupled with the negative initial peak, indicate that it is not likely that the disturbance source is located in front of Meter 1. Therefore, by examining both pieces of evidence, we are still able to make an accurate decision about the disturbance source direction. Similar results are also obtained from the other meters present in the circuit, and for a separate case with the capacitors installed at Load C.

Recorded Voltage Sag

Figure 21:
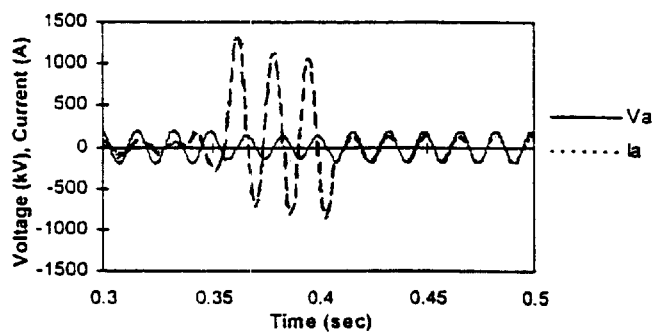
FIGS. 21, 22 and 23 are signal diagrams illustrating the phase A voltage and current, the disturbance energy through a meter and the disturbance power, respectively, for an actual sag disturbance recorded on TU Electric transmission system near Austin, Tex.
Figure 22:
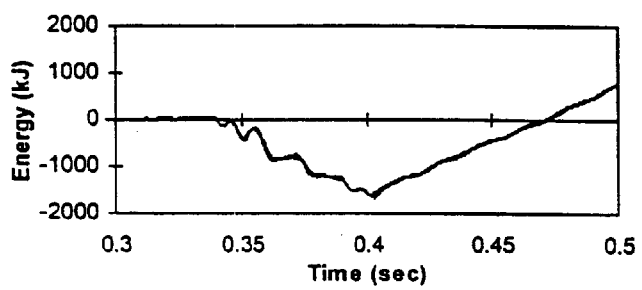

FIG. 21 shows the phase A voltage and current for an actual sag disturbance recorded on Texas Utilities Electric's (TU Electric's) transmission system near Austin, Tex. Before the disturbance event, the current slightly lags the voltage. When the fault is on, however, the current leads the voltage, indicating a fault in the negative direction, or behind the disturbance locating system. FIG. 22 shows the disturbance energy through the meter. When the fault clears at approximately 0.4 seconds, the negative value of disturbance energy indicates a fault in the negative direction (i.e., behind the meter), confirming the results given by the phase angle observation. The net energy starts to rise again as the system recovers from the fault, but this is not a concern, as it occurs only after the fault has cleared and the system has reached a new steady-state.

Figure 23:
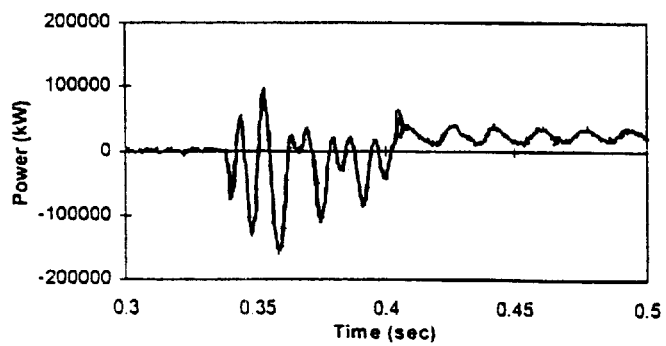

The disturbance power for this sag disturbance is shown in FIG. 23. As before, the negative initial peak confirms the decision we made based on the disturbance energy, and allows us to identify the source location with a greater degree of confidence.

Recorded Capacitor Switching

Figure 24:
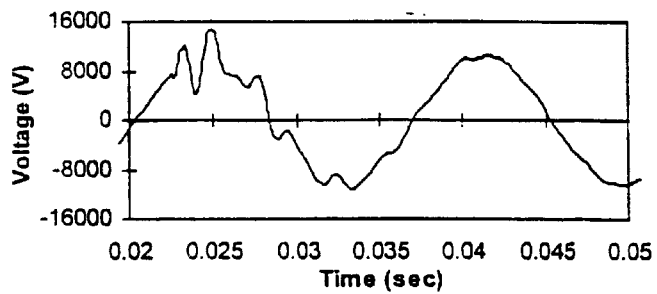
FIGS. 24, 25 and 26 are signal diagrams illustrating a phase voltage and current, the disturbance energy through a meter and the disturbance power, respectively, of a capacitor switching event recorded on a distribution feeder in the TU Electric system in Dallas, Tex.
Figure 25:
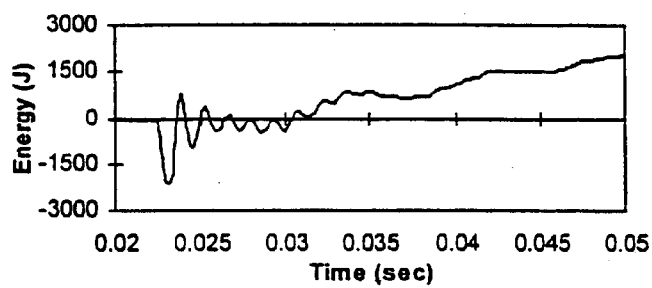

FIG. 24 shows the voltage for one phase of a capacitor switching event recorded on a distribution feeder in the TU Electric system in Dallas, Tex. The disturbance shown in the figure is known to have been caused by a capacitor switching event that took place behind the meter. The associated disturbance energy, shown in FIG. 25, oscillates about zero until the disturbance is nearly over (about 0.030 sec), at which time it begins to climb due to the circuit entering a new steady-state. Therefore, at the effective end of the disturbance, the disturbance energy is "small", and the test is inconclusive. We recommend that "small" be defined as less than 80% of the maximum excursion of the waveform (i.e. 0.80*2200J in this case).

Figure 26:
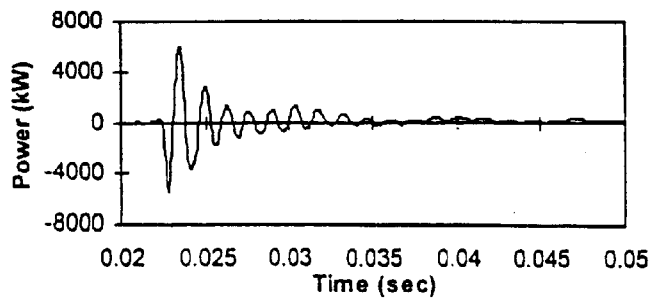

In a case such as this one where the disturbance energy test is inconclusive, we may still be able to determine the direction based on the disturbance power. By looking at the disturbance power in FIG. 26, we see that the initial peak is negative, which indicates that the disturbance originates in the negative direction. Thus, even though we are not able to make a conclusion based on the energy flow, we are still able to find the correct direction by examining the initial peak of the disturbance power.

Figure 27:
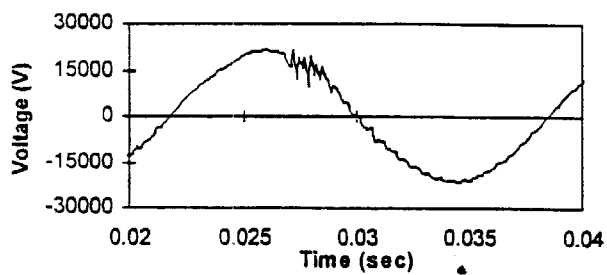
FIGS. 27, 28 and 29 are signal diagrams illustrating a phase voltage and current, the disturbance energy through a meter and the disturbance power, respectively, for a capacitor switching event recorded on a TU Electric distribution feeder in Round Rock, Tex.
Figure 28:
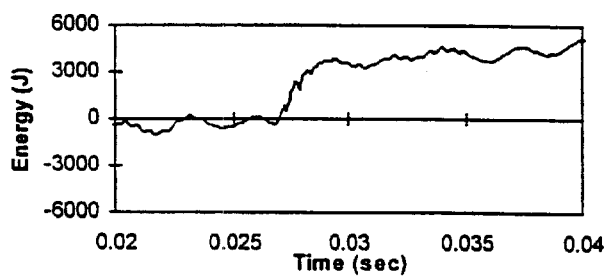
Figure 29:
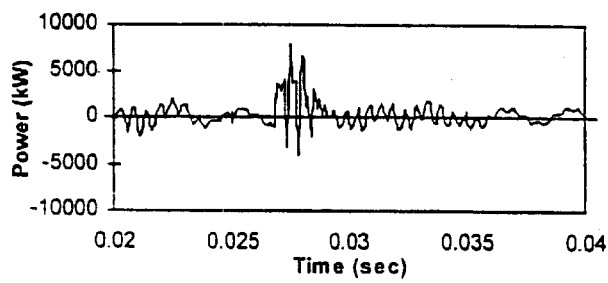

FIG. 27 shows one phase voltage for a capacitor switching event recorded on a TU Electric distribution feeder in Round Rock, Tex. The source of this disturbance is known to have been located in front of the meter. FIG. 28 shows the associated disturbance energy, while FIG. 29 shows the disturbance power. As we see in FIGS. 28 and 29, both indicators (i.e., disturbance energy and the initial peak of the disturbance power) are in agreement.

Figure 30:
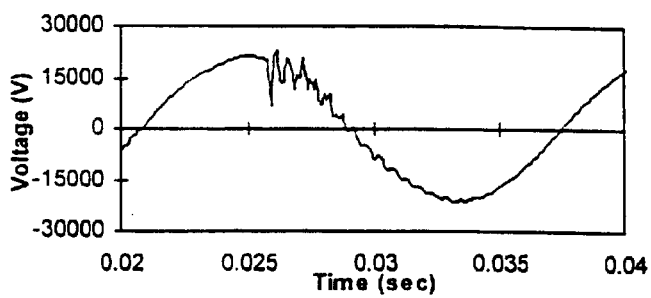
FIGS. 30, 31 and 32 are signal diagrams illustrating the phase A voltage and current, the disturbance energy through a meter and the disturbance power, respectively, for a forward capacitor switching event.
Figure 31:
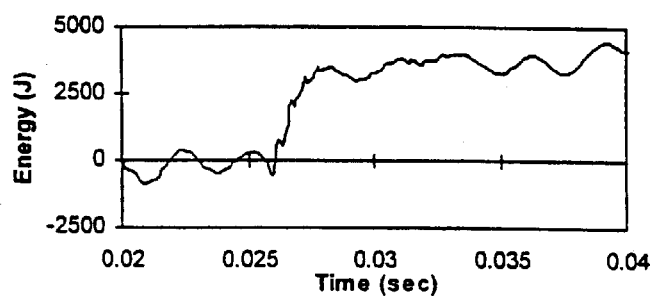
Figure 32:
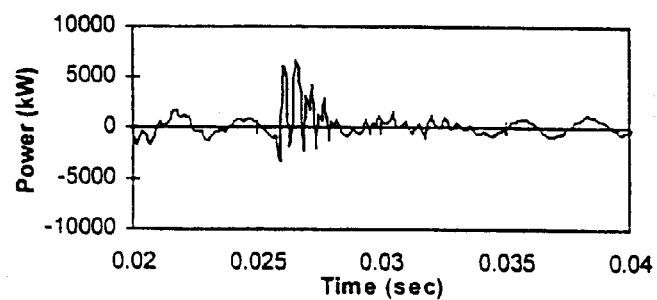

The results for another forward capacitor switching event are shown in FIGS. 30, 31, and 32. For this disturbance, the net disturbance energy is positive, while the initial peak of the disturbance power is negative. In this case, where there is a strong positive energy flow, we decide that the disturbance must be in front of the meter (as it actually was). The decision, however, is not confirmed by the initial peak of the disturbance power. Therefore, our confidence in the decision is not as high as for the event shown in FIG. 27, where both indicators give the same result.

Method of Operation

Consistent with the above descriptions, a disturbance locating system constructed according to the present invention makes a judgment as to which side of the disturbance locating system a power quality disturbance event originates by examining sampled voltage and current waveforms. This is accomplished by examining the disturbance power and energy flow and the polarity of the initial peak of the disturbance power. If enough disturbance locating systems are available in a network, the source of the disturbance may be pinpointed with a high degree of accuracy.

Figure 33:
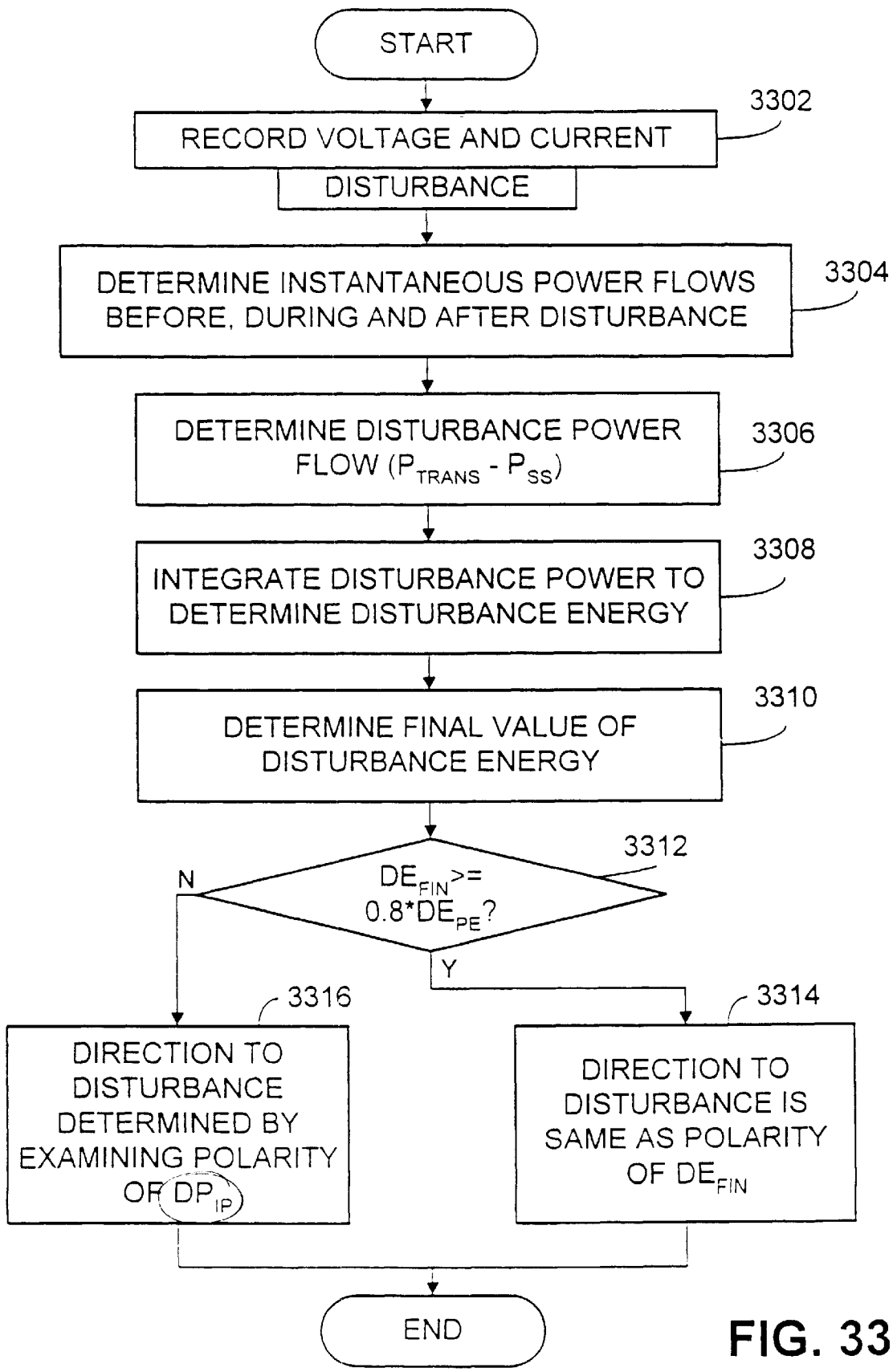
FIG. 33 is a flow diagram illustrating operation of a disturbance locating system constructed according to the present invention.

FIG. 33 sets out the steps of a method of operation according to the present invention. Operation commences at step 3302 wherein the system continually records the voltage on the line and current flowing through the line at a location of observation on the line. After a disturbance has been detected, the method determines the beginning and end points of the disturbance event. Then, at step 3304, the method includes calculating the three-phase instantaneous power (IP) before, during, and after the event, using the equation:

$$IP = V_a I_a + V_b I_b + V_c I_c \quad \text{(Equation 1)}$$

Once the three-phase instantaneous power has been calculated before, during and after the event, the method includes determining the steady state power $P_{SS}$, and the transient disturbance power $P_{TRANS}$. Using these values, the method then includes determining the disturbance power which is the difference between the three-phase instantaneous power and the steady state power $P_{SS}$. The disturbance power is then integrated at step 3308 to determine the disturbance energy.

Next, at step 3312, the method includes determining whether the final disturbance energy, $DE_{FIN}$ is greater than or equal to eighty percent (80%) of the peak excursion, $DE_{PE}$ of the disturbance energy. If the final value of the disturbance energy is greater than or equal to 80% of the peak excursion of the disturbance energy during the event, operation proceeds to step 3314 and the energy test is conclusive. The disturbance direction is the same as the polarity of the final disturbance energy value. If the polarity of the initial peak of the disturbance power matches the polarity of the final disturbance energy value, then we have a high degree of confidence. Else, we still declare the disturbance to be in the direction indicated by the disturbance energy, but with a lesser degree of confidence.

If the final value of the disturbance energy is less than 80% of the peak excursion of the disturbance energy at step 3312, operation proceeds to step 3316 where it is determined that the energy test is inconclusive. In such case, the disturbance direction is determined by examining the polarity of the initial peak of the disturbance power. From both steps 3314 and 3316, the method concludes.

While only two major types of disturbances are described herein, the method and system presented are applicable to other disturbance types, as well. For example, motor starting disturbances that induce voltage sags are prime candidates, since a great deal of energy must be delivered to the motor to bring it up to speed. This information may prove valuable to utilities interested in locating the sources of recorded disturbances in order to determine whether a disturbance originated inside or outside of a customer facility, for example.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What we claim is:

1. For use in estimating the direction to a disturbance source in a power system, an apparatus comprising:
   a voltage transducer coupleable to the power system and operative to produce a first signal representative of a voltage within the power system;
   a current transducer coupleable to the power system and operative to produce a second signal representative of a current within the power system; and
   a logic circuit coupled to the voltage transducer and the current transducer, the logic circuit being operative to calculate a disturbance quantity based upon the first and second signals, the logic circuit using the disturbance quantity to estimate the direction to the disturbance source, and wherein the estimate of the direction indicates one of a forward direction and a behind direction and the disturbance quantity comprises a first measure of an initial peak excursion of a disturbance energy signal and a second measure of a total disturbance energy, the logic circuit further comprising:
   a weighting factor;
   a processing circuit coupled to receive the first measure, the second measure and the weighting factor, the processing circuit operative to produce a result by comparing the first measure combined with the weighting factor to the second measure, and to selectively estimate the direction to the disturbance source based on the polarity of the first measure if the result has a first value, and based on the polarity of the second measure if result has a second value.

2. For use in estimating the direction to a disturbance source in a power system, an apparatus comprising:
   a voltage transducer coupleable to the power system and operative to produce a first signal representative of a voltage within the power system;
   a current transducer coupleable to the power system and operative to produce a second signal representative of a current within the power system; and a logic circuit coupled to the voltage transducer and the current transducer, the logic circuit being operative to calculate a disturbance quantity based upon the first and second signals, the logic circuit using the disturbance quantity to estimate the direction to the disturbance source, and wherein the estimate of the direction indicates one of a forward direction and a behind direction and the disturbance quantity comprises a first measure of an initial peak excursion of a disturbance energy signal and a second measure of a total disturbance energy, the logic circuit further comprising:

a weighting factor;

a processing circuit coupled to receive the first measure, the second measure and the weighting factor, the processing circuit operative to produce a result by comparing the first measure combined with the weighting factor to the second measure, and to selectively estimate the direction to the disturbance source based on the polarity of the first measure if the result has a first value, and based on the polarity of the second measure if result has a second value, and wherein the value takes on one of two states corresponding to true and false.

3. For use in estimating the direction to a disturbance source in a power system, an apparatus comprising:

a voltage transducer coupleable to the power system and operative to produce a first signal representative of a voltage within the power system;

a current transducer coupleable to the power system and operative to produce a second signal representative of a current within the power system; and a logic circuit coupled to the voltage transducer and the current transducer, the logic circuit being operative to calculate a disturbance quantity based upon the first and second signals, the logic circuit using the disturbance quantity to estimate the direction to the disturbance source, and wherein the estimate of the direction indicates one of a forward direction and a behind direction and the disturbance quantity comprises a first measure of an initial peak excursion of a disturbance energy signal and a second measure of a total disturbance energy, the logic circuit further comprising:

a weighting factor;

a processing circuit coupled to receive the first measure, the second measure and the weighting factor, the processing circuit operative to produce a result by comparing the first measure combined with the weighting factor to the second measure, and to selectively estimate the direction to the disturbance source based on the polarity of the first measure if the result has a first value, and based on the polarity of the second measure if result has a second value, and wherein the weighting factor is substantially equal to 0.8.

4. For use in estimating the direction to a disturbance source in a power system, an apparatus comprising:

a voltage transducer coupleable to the power system and operative to produce a first signal representative of a voltage within the power system;

a current transducer coupleable to the power system and operative to produce a second signal representative of a current within the power system; and a logic circuit coupled to the voltage transducer and the current transducer, the logic circuit being operative to calculate a disturbance quantity based upon the first and second signals, the logic circuit using the disturbance quantity to estimate the direction to the disturbance source, and wherein the estimate of the direction indicates one of a forward direction and a behind direction and the disturbance quantity comprises a first measure of an initial peak excursion of a disturbance energy signal and a second measure of a total disturbance energy, the logic circuit further comprising:

a weighting factor;

a processing circuit coupled to receive the first measure, the second measure and the weighting factor, the processing circuit operative to produce a result by comparing the first measure combined with the weighting factor to the second measure, and to selectively estimate the direction to the disturbance source based on the polarity of the first measure if the result has a first value, and based on the polarity of the second measure if result has a second value, and wherein the weighting factor is combined with the first measure using a multiplication operation.

5. For use in estimating the direction to a disturbance source in a power system, an apparatus comprising:

a voltage transducer coupleable to the power system and operative to produce a first signal representative of a voltage within the power system;

a current transducer coupleable to the power system and operative to produce a second signal representative of a current within the power system; and a logic circuit coupled to the voltage transducer and the current transducer, the logic circuit being operative to calculate a disturbance quantity based upon the first and second signals, the logic circuit using the disturbance quantity to estimate the direction to the disturbance source, and wherein the estimate of the direction indicates one of a forward direction and a behind direction and the disturbance quantity comprises a first measure of an initial peak excursion of a disturbance energy signal and a second measure of a total disturbance energy, the logic circuit further comprising:

a weighting factor;

a processing circuit coupled to receive the first measure, the second measure and the weighting factor, the processing circuit operative to produce a result by comparing the first measure combined with the weighting factor to the second measure, and to selectively estimate the direction to the disturbance source based on the polarity of the first measure if the result has a first value, and based on the polarity of the second measure if result has a second value, and wherein the processing circuit produces the first value when the first measure combined with the weighting factor is less than or equal to the second measure.

6. In a power grid a method for determining a relative direction from a monitoring location on a line to a source of a disturbance, the method comprising:

monitoring a current flowing through the line in the power grid at the monitoring location;

monitoring a voltage on the line in the power grid at the monitoring location;

determining a disturbance energy flow through the line;

determining the disturbance power flow in the line based on the disturbance energy flow through the line; and based on the disturbance energy flow through the line, estimating a relative direction to the source of the disturbance from the monitoring location, and wherein the estimating of the relative direction to the source of the disturbance from the monitoring location is also based upon the disturbance power flow in the line, and wherein the estimate of the relative direction to the source of the disturbance from the monitoring location is based upon the polarity of the initial peak of the disturbance power.

7. In a power grid a method for determining a relative direction from a monitoring location on a line to a source of a disturbance, the method comprising:

monitoring a current flowing through the line in the power grid at the monitoring location;

monitoring a voltage on the line in the power grid at the monitoring location;

determining a disturbance energy flow through the line;

determining the disturbance power flow in the line based on the disturbance energy flow through the line; and based on the disturbance energy flow through the line, estimating a relative direction to the source of the disturbance from the monitoring location, and wherein the estimating of the relative direction to the source of the disturbance from the monitoring location is also based upon the disturbance power flow in the line, and wherein the estimate of relative direction to the source of the disturbance from the monitoring location is based upon the polarity of the final value of the disturbance energy if final value of the disturbance energy is at least about 0.8 multiplied by the peak excursion of the disturbance energy, and wherein the estimate of relative direction to the source of the disturbance from the monitoring location is based upon the polarity of the initial peak of the disturbance energy if final value of the disturbance energy is not at least about 0.8 multiplied by the peak excursion of the disturbance energy.

* * * * *